Nov. 27, 1934.  M. J-B. BARBAROU  1,982,603
ECCENTRIC CONTROL
Filed Feb. 24, 1933
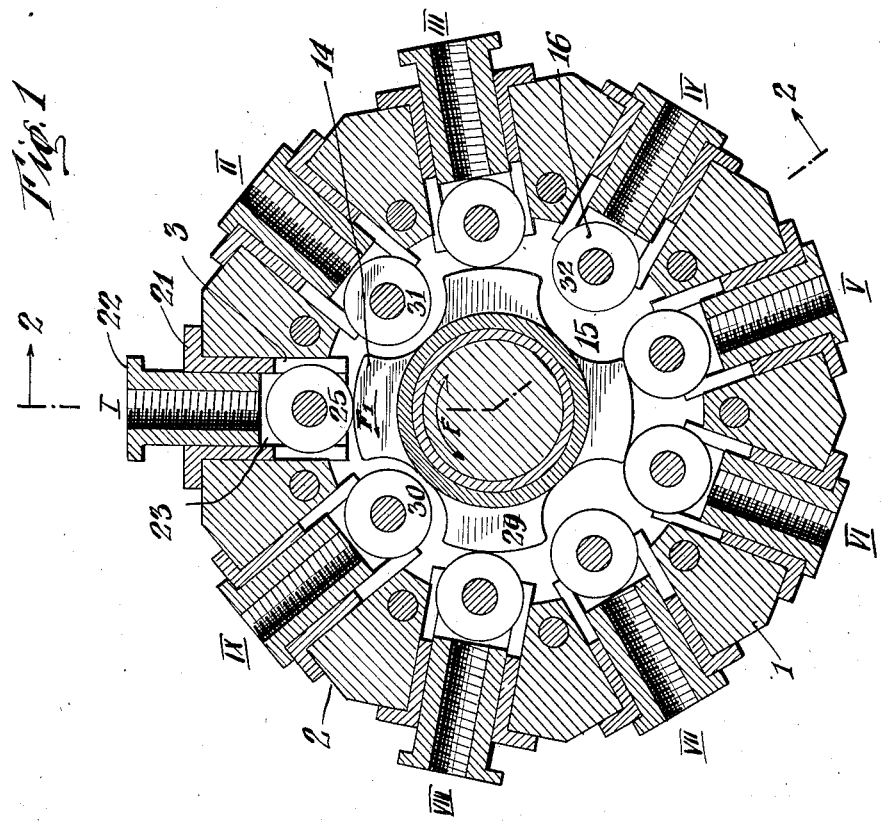
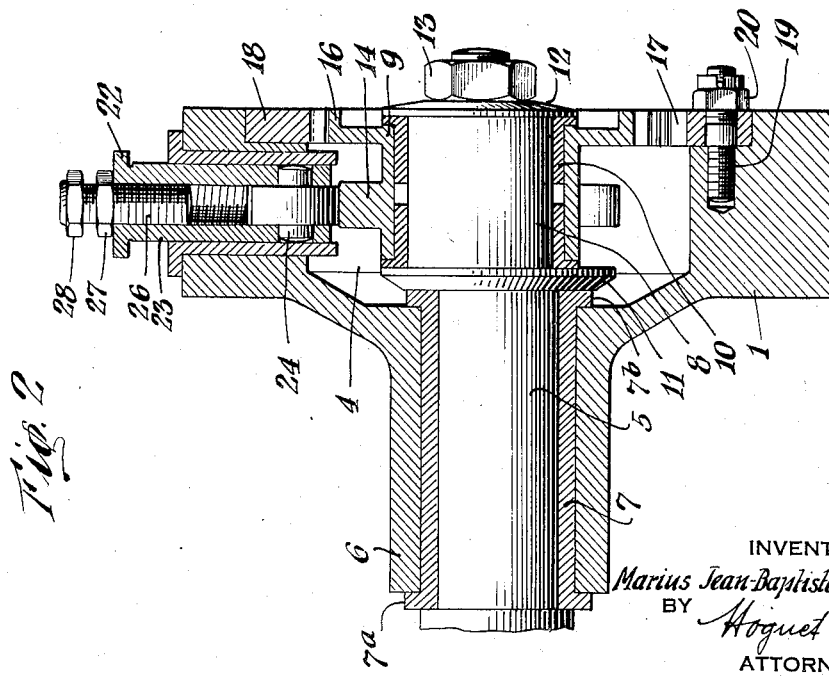
INVENTOR
Marius Jean-Baptiste Barbarou
BY
Hoguet & Neary
ATTORNEYS Patented Nov. 27, 1934

1,982,603

UNITED STATES PATENT OFFICE 1,982,603

ECCENTRIC CONTROL

Marius Jean-Baptiste Barbarou, Neuilly-sur-Seine, France

Application February 24, 1933, Serial No. 658,327
In France February 24, 1932

4 Claims. (Cl. 74—55)

This invention relates in general to devices for the transmission of movement to an uneven number of mechanical parts and more particularly to an improved eccentric means of control of the mechanism for the distribution of fuel to the various cylinders of a radial motor.

An object of the invention is to provide a simplified control device of minimum size and minimum number of moving parts as well as a substantial reduction of friction surfaces, size of construction and decrease in weight of the assembly.

The invention is embodied in a device characterized by the fact that it comprises a cam plate which may be loosely carried concentrically upon an eccentric extension of the usual motor shaft in such a manner that the cam plate may be adapted to be rotated by gears arranged concentrically with the motor shaft and adapted to operatively engage a number of radially slideable members which are actuated by the cams of the plate. In such an arrangement the cam plate is subjected to a cycloidal movement, an eccentric circular movement and a movement of rotation upon itself by means of the gears arranged concentrically with relation to the motor shaft, this system of rotation being caused by that of the control shaft on the one hand, and by being related to the gears selected on the other hand.

Another object of the invention is to provide a simple and effective cam plate for this particular purpose and to this end it is proposed to form the cam plate by merely taking a circular plate and forming therein recesses partaking of the nature of a semi-circle at spaced intervals around the periphery of the plate so as to provide cam actuating surfaces and also provide non-operating countersunk surfaces which will not contact with any of the parts to be operated.

With the foregoing and other objects in view, the invention consists in the combination of parts and in the details of construction set forth in the following specification and appended claims, certain embodiments being illustrated in the accompanying drawing, in which:

Figure 1 is a view in vertical secton taken through the assembly;

Figure 2 is a view in section taken along line 2—2 of Figure 1.

Referring more particularly to the drawing, a casing 1 serves as a support for the control elements. The casing has its periphery plane surfaces 2 formed in such a manner that their cross-section is polygonal, as shown in Figure 1.

These sections are arranged radially with respect to the drive shaft.

The motor shaft 5 is supported by a bracket 6 provided with a bearing 7 which has shoulders 7a and 7b extending beyond the extremities of the straight portion of the bracket 6. The shaft 5 also carries an eccentric extension 8 upon which latter a sleeve 9 is freely mounted with a bearing 10 interposed therebetween, the sleeve and bearing terminating at the abutment 11 on the motor shaft and otherwise maintained in their position at the other end by means of a suitable washer 12 and nut 13.

The sleeve 9 comprises substantially at its central portion a plate provided with a series of cams 14 formed by the countersunk recesses 15. The sleeve 9 is also provided at its outer extremity with a straight set of gears 16 fixedly mounted to the sleeve, which gears 16 have an internal engagement with a larger set of gears 17, rigidly fixed to the rim 18, which is secured to the casing by means of bolts 19 and nuts 20. Cylinder portions 3 are provided to receive bearings 21 which serve to guide the reciprocatory members 22, which latter may be adapted to control the operation of opening and closing of the motor valves. As a means of finer adjustment the members 22 may be internally screw-threaded to receive a bolt 26 with its accompanying adjustment nuts 27 and 28 to regulate the effective length thereof. Members 22 may have mounted on their lower portions rollers 25 which are adapted to be engaged by the cams 14 to effect the reciprocatory movement of the members by such engagement.

From the foregoing it will be clearly seen that when the motor shaft 5 rotates in the direction of the arrow F, as shown in Figure 1, the sleeve 9 being actuated by the eccentric 8 has a tendency to be rotated in the same clockwise direction as F, but the movable set of gears 16 fixedly carried by the sleeve 9 causes, by reason of the engagement of gears 16 with the fixed gears 17, a rotation of the cam plate in a counterclockwise direction, as indicated at 21; that is to say, inversely to the rotation of the shaft 5.

In case that it is desired to apply this device for the purpose of controlling valves of a motor having an uneven number of radially disposed cylinders, for example 9, the order of firing should be for two revolutions of the motor shaft, as follows:

I, III, V, VII, IX, II, IV, VI, and VIII.

The number of cams on the plate should be for four and the speed of rotation approximately one-eighth that of the motor which determines the engagement and lifting of the respective operating members and the consequent timing of the motor.

For instance, as a starting position the elements as represented in Figure 1, the direction of the movement of the motor being that as indicated at F, the pusher members or tappets 22 of cylinder or member I is raised to its highest position; members III and V are being lifted; member VII is on the point of being engaged by one of the cams; members VI and VIII are receding from the preceding revolution of the cam plate. All of the other friction rollers are situated in the recesses of the cam plate and are not engaged. After a rotation of the shaft through, for instance, ninety (90°) degrees, the plate, having followed the eccentric, forces the member III to its furthest outward position and member V continues its outward movement by the simultaneous movement of rotation and the particular cam 29, as designated in Figure I, engages the member VIII which is being lifted outwardly. During this movement the friction rollers 30, 31 and 32 have remained motionless.

The particular arrangement of the cam plates makes it possible to considerably reduce the overall radial dimensions of the apparatus and thus diminishes the acceleration and the inertia of the pieces in movement.

Thus there has been provided an arrangement of parts which has a wide application, in that it is easily adaptable to be used in conjunction with radially mounted pistons and cylinder assemblies so as to either function as a crankshaft or as a means of valve operation, or pump, or supercharger.

I claim:

1. In a device of the character described for use in conjunction with radial motors, a driving shaft and an eccentric carried thereby, a sleeve rotatably and concentrically mounted on said eccentric tending to cause said sleeve to be translated in a direction corresponding to that of the eccentric, stationary means for opposing said rotation of said sleeve and causing the latter to rotate in an opposite direction.

2. In a device of the character described for use in conjunction with radial motors, a casing, a driving shaft and an eccentric carried thereby, a sleeve rotatably and concentrically mounted on said eccentric tending to cause said sleeve to be translated in a direction corresponding to that of the eccentric, means for opposing said rotation of said sleeve and causing the latter to rotate in an opposite direction, said means comprising a gear rotatably fixedly mounted on said sleeve and a fixed gear carried by said casing adapted to be engaged by said first mentioned gear.

3. In a device of the character described for use in conjunction with radial motors, a casing, a driving shaft and an eccentric carried thereby, a sleeve rotatably and concentrically mounted on said eccentric tending to cause said sleeve to be translated in a direction corresponding to that of the eccentric, means for opposing said rotation of said sleeve and causing the latter to rotate in an opposite direction, said means comprising a gear rotatably fixedly mounted on said sleeve and a fixed gear carried by said casing adapted to be engaged by said first mentioned gear, said casing carrying a plurality of radially disposed reciprocatory members and said plate being formed with a series of alternately arranged cams and recesses, said cams being adapted to reciprocate said members.

4. In a device of the character described for use in conjunction with radial motors, a casing, a driving shaft and an eccentric carried thereby, a sleeve rotatably and concentrically mounted on said eccentric tending to cause said sleeve to be translated in a direction corresponding to that of the eccentric, means for opposing said rotation of said sleeve and causing the latter to rotate in an opposite direction, said means comprising a gear rotatably fixedly mounted on said sleeve and a fixed gear carried by said casing adapted to be engaged by said first mentioned gear, said casing carrying a plurality of radially disposed reciprocatory members and a plate being formed with a series of alternately arranged cams and recesses, said cams being adapted to reciprocate said members, said reciprocatory members being slidably mounted in said casing and formed with guideways and roller members carried on the inner portions of the members for engagement by said cams.

MARIUS JEAN-BAPTISTE BARBAROU.